No. 858,057. PATENTED JUNE 25, 1907.
A. A. BOISMAURE.
JEWEL MOUNTING.
APPLICATION FILED JULY 23, 1906.
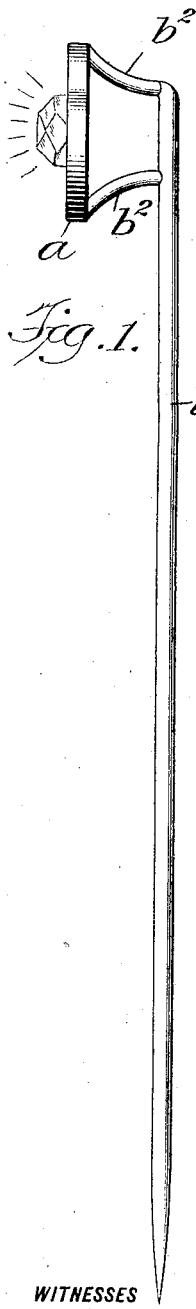
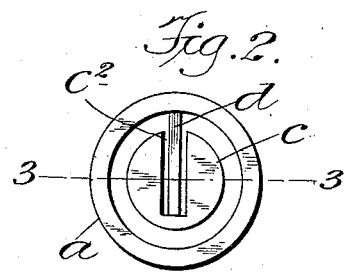
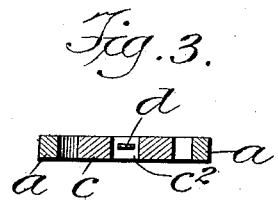
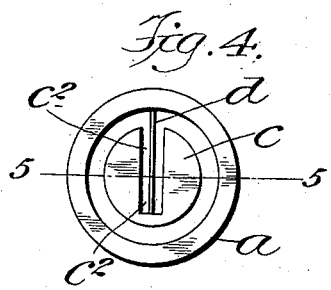
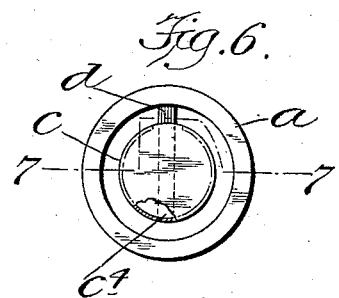
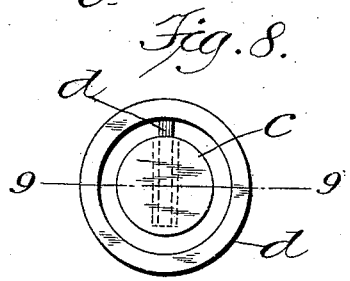
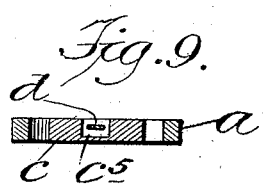
WITNESSES
INVENTOR
Alfred A. Boismaure,
BY Edgar Tate &Co
ATTORNEYS

UNITED STATES PATENT OFFICE.

ALFRED A. BOISMAURE, OF NEW YORK, N. Y., ASSIGNOR TO THE BOISMAURE OSCILLATING JEWELRY COMPANY, OF NEW JERSEY.

JEWEL-MOUNTING.

No. 858,057.      Specification of Letters Patent.      Patented June 25, 1907.

Application filed July 23, 1906. Serial No. 327,252.

*To all whom it may concern:*

Be it known that I, ALFRED A. BOISMAURE, a citizen of the United States, and residing at New York, in the county of New York and State of New York, have invented certain new and useful Improvements in Jewel-Mountings, of which the following is a specification, such as will enable those skilled in the art to which it appertains to make and use the same.

The object of this invention is to provide an improved mounting for jewels and other ornaments comprising two concentrically arranged members, the outer member being provided with a diametrically arranged vibratory spring which is also secured to the inner member centrally thereof whereby one of said members, when the other is secured to an attaching device, such as a pin, ring or the like, will be kept in a constant state of vibration.

The invention is fully disclosed in the following specification, of which the accompanying drawing forms a part, in which the separate parts of my improvement are designated by suitable reference characters in each of the views, and in which:—

Figure 1 is a side view of an ordinary scarf pin provided with my improved jewel mounting; Fig. 2 a front view of the mounting with the pin detached; Fig. 3 a section on the line 3—3 of Fig. 2; Fig. 4 a view similar to Fig. 2 but showing a modification; Fig. 5 a section on the line 5—5 of Fig. 4; Fig. 6 a view similar to Fig. 1 but showing another modification; Fig. 7 a partial section on the line 7—7 of Fig. 6; Fig. 8 a view similar to Fig. 2 but showing another modification; and, Fig. 9 a section on the line 9—9 of Fig. 8.

In the practice of my invention, as shown in Figs. 1 and 2, I provide an outer frame member $a$ which is preferably circular in form and with which is connected a pin $b$, this connection being made by means of backwardly directed and inwardly curved arms $b^2$ secured to the frame member $a$. Placed concentrically within the frame member $a$ is a vibratory member $c$ having a diametrically arranged slot $c^2$ formed therein which extends almost entirely across said member, and secured to the frame member $a$ is a vibratory or resilient spring $d$ which ranges diametrically of said frame member and the inner end of which is secured to the vibratory member $c$ at the inner end of the slot or opening $c^2$. With this construction the member $c$ will be kept in a constant state of vibration when the pin or other device is in use, and although I have shown my invention, in Fig. 1, applied to an ordinary pin such as a scarf pin, it will be apparent that the same may be applied to any kind of an ornament such as a brooch pin, ring or similar device employing an outer frame member and an inner concentric vibratory member.

In Figs. 4 and 5 I have shown a construction similar in all respects to that shown in Figs. 1 to 3 inclusive except that the spring $d$ instead of being placed in a plane the same as that of the frame member $a$, and central vibratory member $c$, is placed in a plane at right angles to that of the members $a$ and $d$.

In the construction shown in Figs. 6 and 7 the central member $c$ is box-shaped in form and provided in one face thereof with an opening $c^3$ through which the spring $d$ is passed, and the spring $d$ is secured to the side of the member $c$ at $c^4$ or opposite the side of said member in which the opening $c^3$ is formed.

In Figs. 8 and 9 I have shown another modification in which the central member $c$ is provided in the back thereof with a diametric groove $c^5$ into and through which the spring $d$ passes, and in all the forms of construction it will be seen that the spring $d$ extends almost entirely across the central vibratory member, or beyond the center thereof, the object of this construction being to give the spring $d$ a greater resiliency or greater degree of vibration.

Although I have shown the frame member $a$ and central vibratory member $c$ as circular in form, it will be apparent that the same may be angular in form, elliptical in form, or of any desired shape, and although the central vibratory member $c$ consists of a plate or box-shaped device in all the forms of construction shown, it will be apparent that the same may be composed of a ring or any suitable openwork.

In practice the gem, stone or other article is connected with, set on, or secured to the central vibratory member, and this may be done in the manner of setting jewels or other ornaments in rings, pins or other devices.

Having fully described my invention, what I claim as new and desire to secure by Letters Patent, is;—

1. A jewel mounting comprising an outer frame member, a vibratory spring secured to one side of said frame member and ranging diametrically of said frame member, and a central vibratory member secured to the inner end of said spring.

2. A jewel mounting comprising two concentrically arranged members, the outer member being provided with a diametrically ranging spring secured to one side thereof and to the inner end of which the vibratory member is secured.

3. A jewel mounting comprising two concentrically arranged members, the outer member being provided with a vibratory spring which ranges diametrically thereof but does not extend entirely across said member, and to the inner end of which the inner member is secured.

4. A jewel mounting comprising two concentrically arranged members, the outer member being provided with a vibratory spring which ranges diametrically thereof but does not extend entirely across said member, and the inner member being provided with a diametric groove or opening in the inner end of which said spring is secured.

5. A jewel mounting comprising two concentrically arranged members, the outer member being provided with a vibratory spring which ranges diametrically thereof and extends across the center thereof, and to the inner end of which the inner member is secured.

6. A jewel mounting comprising two concentrically arranged members, the outer member being provided with a vibratory spring which ranges diametrically thereof and extends across the center thereof, and the inner member being provided with a diametric slot or opening, at the inner end of which said spring is secured.

In testimony that I claim the foregoing as my invention I have signed my name in presence of the subscribing witnesses this 18th day of July 1906.

ALFRED A. BOISMAURE.

Witnesses:
F. A. STEWART,
C. J. KLEIN.